US008085261B2

(12) United States Patent
Fang et al.

(10) Patent No.: US 8,085,261 B2

(45) Date of Patent: Dec. 27, 2011

(54) LCD WITH THE FUNCTION OF ELIMINATING THE POWER-OFF RESIDUAL IMAGES

(75) Inventors: Yu-Chieh Fang, Kaohsiung (TW); Liang-Hua Yeh, Taipei County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 425 days.

(21) Appl. No.: 12/426,296

(22) Filed: Apr. 20, 2009

(65) Prior Publication Data

US 2010/0182305 A1 Jul. 22, 2010

(30) Foreign Application Priority Data

Jan. 20, 2009 (TW) ............................... 98102016 A

(51) Int. Cl.
*G06F 3/038* (2006.01)
*G09G 5/00* (2006.01)

(52) U.S. Cl. ........................................ 345/212; 345/100

(58) Field of Classification Search ............ 345/87–104, 345/205, 206, 210–214
See application file for complete search history.

(56) References Cited

U.S. PATENT DOCUMENTS

| | | | | |
|---|---|---|---|---|
| 7,109,965 B1 * | 9/2006 | Lee et al. | 345/98 |
| 2002/0080133 A1 * | 6/2002 | Eu | 345/212 |
| 2004/0189629 A1 * | 9/2004 | Fukutoku | 345/211 |
| 2004/0239655 A1 * | 12/2004 | Tani et al. | 345/204 |
| 2007/0091040 A1 * | 4/2007 | Wu | 345/87 |
| 2008/0006833 A1 * | 1/2008 | Hirakata | 257/79 |
| 2008/0106666 A1 * | 5/2008 | Lee et al. | 349/48 |

* cited by examiner

*Primary Examiner* — Chanh Nguyen
*Assistant Examiner* — Navin Lingaraju
(74) *Attorney, Agent, or Firm* — Winston Hsu; Scott Margo

(57) ABSTRACT

An LCD includes a PWB, a FPC, and a display panel. The PWB includes a level shift circuit and a power-off discharge circuit. The display panel includes a gate driving circuit and a TFT array. The power-off discharge circuit can electrically connects a gate high voltage end to a gate low voltage end so as to drive the gate driving circuit to turn on all TFTs of the TFT array.

10 Claims, 8 Drawing Sheets

LCD WITH THE FUNCTION OF ELIMINATING THE POWER-OFF RESIDUAL IMAGES

BACKGROUND OF THE INVENTION

1. Field of the Invention

The present invention relates to a Liquid Crystal Display (LCD) capable of eliminating the power-off residual images, and more particularly, to an LCD capable of eliminating the power-off residual images wherein the gate driver is installed on the display panel of the LCD.

2. Description of the Prior Art

The power-off residual images of the LCD generate under the condition that the power supply of the LCD is turned off, the pixel electrodes of the display panel discharge so slowly that the residual electric charge cannot be discharged in time and consequently exist in the pixel capacitors.

Please refer to FIG. 1 and FIG. 2. FIG. 1 is a diagram illustrating the conventional LCD 10 capable of eliminating the power-off residual images. FIG. 2 is a waveform diagram illustrating the signals of the LCD 10. The LCD 10 comprises a power supply 11, a voltage detector 12, a display panel 13, a gate driver 14, and a source driver 15. The power supply 11 provides an input voltage VIN to the source driver 15 and the gate driver 14. Meanwhile, the power supply 11 also provides the input voltage VIN to the voltage detector 12. The voltage detector 12 compares the input voltage VIN with a reference voltage. When the LCD 10 is turned off, the input voltage VIN drops to a level lower than the level of the reference voltage, and the voltage detector 12 sends out an off signal XDON to the gate driver 14. When the off signal XDON changes from the high level to the low level, the gate driver 14 turns on all thin film transistors (TFT) of the display panel 13. In this way, the residual electric charge is effectively discharged so as to improve the problem of the power-off residual images.

However, the problem of the power-off residual images cannot be improved if the LCD disposes the gate driver in the display panel (gate in panel, GIP). In GIP LCD, the gate driver, formed on the glass substrate, is composed of shift registers which are fabricated in the TFT process. Since the gate driver of the GIP LCD is composed of shift registers, under the condition that the GIP LCD is turned off, the gate high voltage VGH cannot be transmitted to all of the gate lines quickly. Therefore, the problem of the power-off residual images in the GIP LCD still remains unsolved.

SUMMARY OF THE INVENTION

The present invention provides a power-off discharge circuit of a Liquid Crystal Display (LCD). The LCD has a gate driver disposed on a display panel of the LCD. The power-off discharge circuit comprises a first transistor, comprising a gate, a source electrically connected to a high-voltage end, and a drain; a second transistor, comprising a gate, a source electrically connected to a ground end, and a drain; a third transistor, comprising a gate, a source electrically connected to the ground end, and a drain; a first resistor, electrically connected between the gate of the third transistor and a power control end; a second resistor, electrically connected between the gate of the third transistor and the ground end; a third resistor, electrically connected between the drain of the third transistor and the high-voltage end; a fourth resistor, electrically connected between the drain of the third transistor and the ground end; a fifth resistor, electrically connected between the source of the first transistor and the gate of the first transistor; a sixth resistor, electrically connected between the drain of the third transistor and the gate of the second transistor; a seventh resistor, electrically connected between the gate of the first transistor and the drain of the second transistor; an eighth resistor, electrically connected between the drain of the first transistor and the ground end; a ninth resistor, electrically connected between the drain of the first transistor and a low-voltage end; a first capacitor, electrically connected between the drain of the third transistor and the ground end; a second capacitor, electrically connected between the source of the first transistor and the gate of the first transistor; and a third capacitor, electrically connected between the drain of the first transistor and the ground end.

The present invention further provides an LCD. The LCD comprises a display panel, comprising a Thin Film Transistor (TFT) array and a gate driving circuit for driving the TFT array; a Printed Wire Board (PWB), comprising a level shift circuit for generating signals controlling the gate driving circuit; and a power-off discharge circuit for electrically connecting a high-voltage end to a low-voltage end during off state of the LCD; and a Flexible Printed Circuit (FPC) electrically connected between the display panel and the PWB, for transmitting the signals controlling the gate driving circuit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " Also, the term "electrically connect" is intended to mean either an indirect or direct electrical connection. Accordingly, if one device is coupled to another device, that connection may be through a direct electrical connection, or through an indirect electrical connection via other devices and connections.

Figure 1:
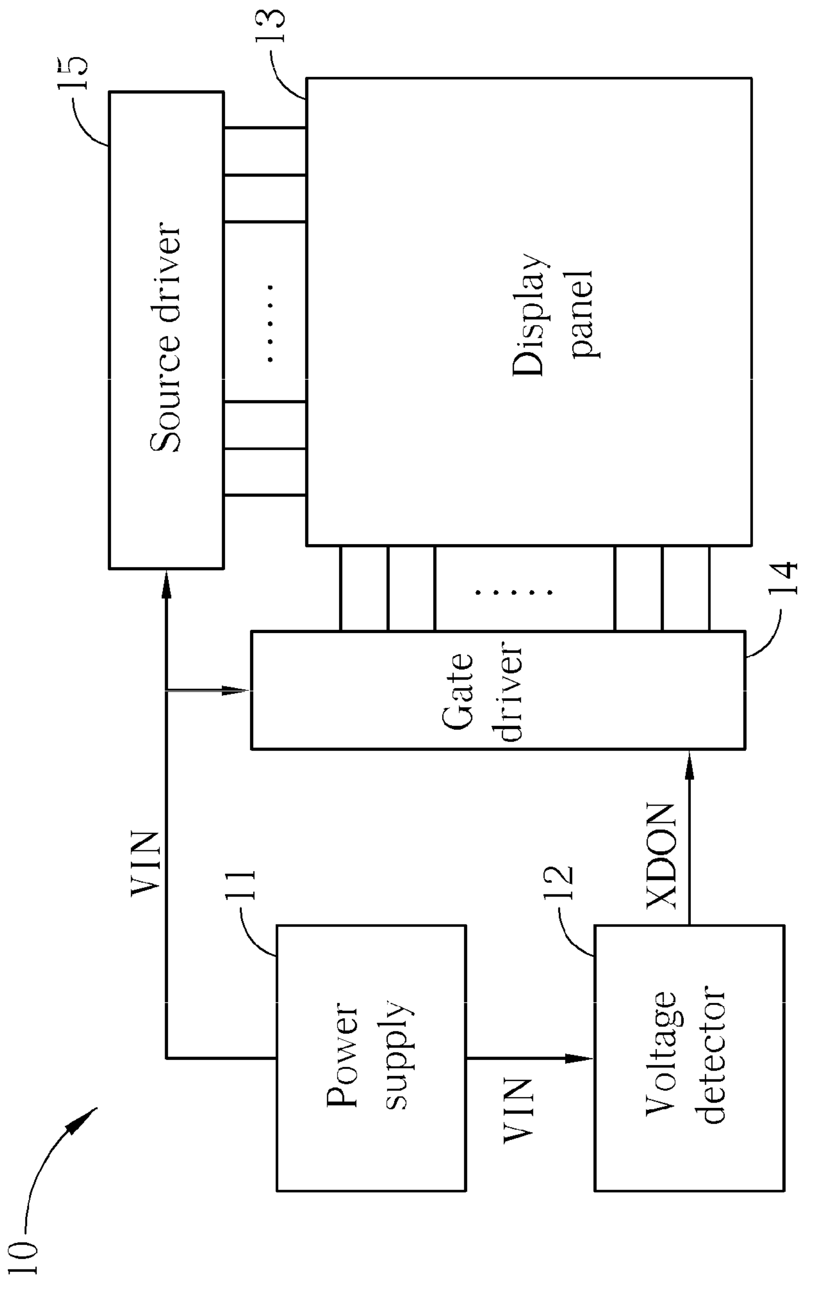
FIG. 1 PRIOR ART
FIG. 1 is a diagram illustrating the conventional LCD capable of eliminating the power-off residual images.
Figure 2:
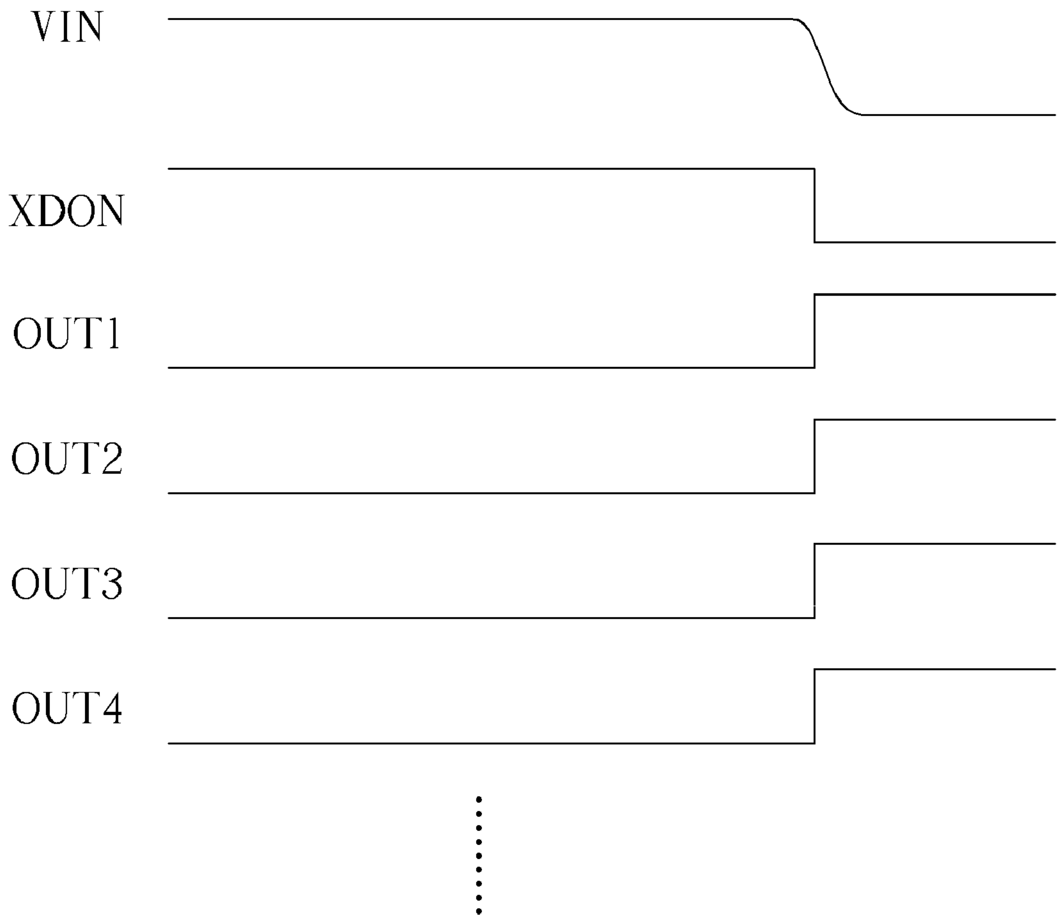
FIG. 2 PRIOR ART
FIG. 2 is a waveform diagram illustrating the signals of the conventional LCD.
Figure 3:
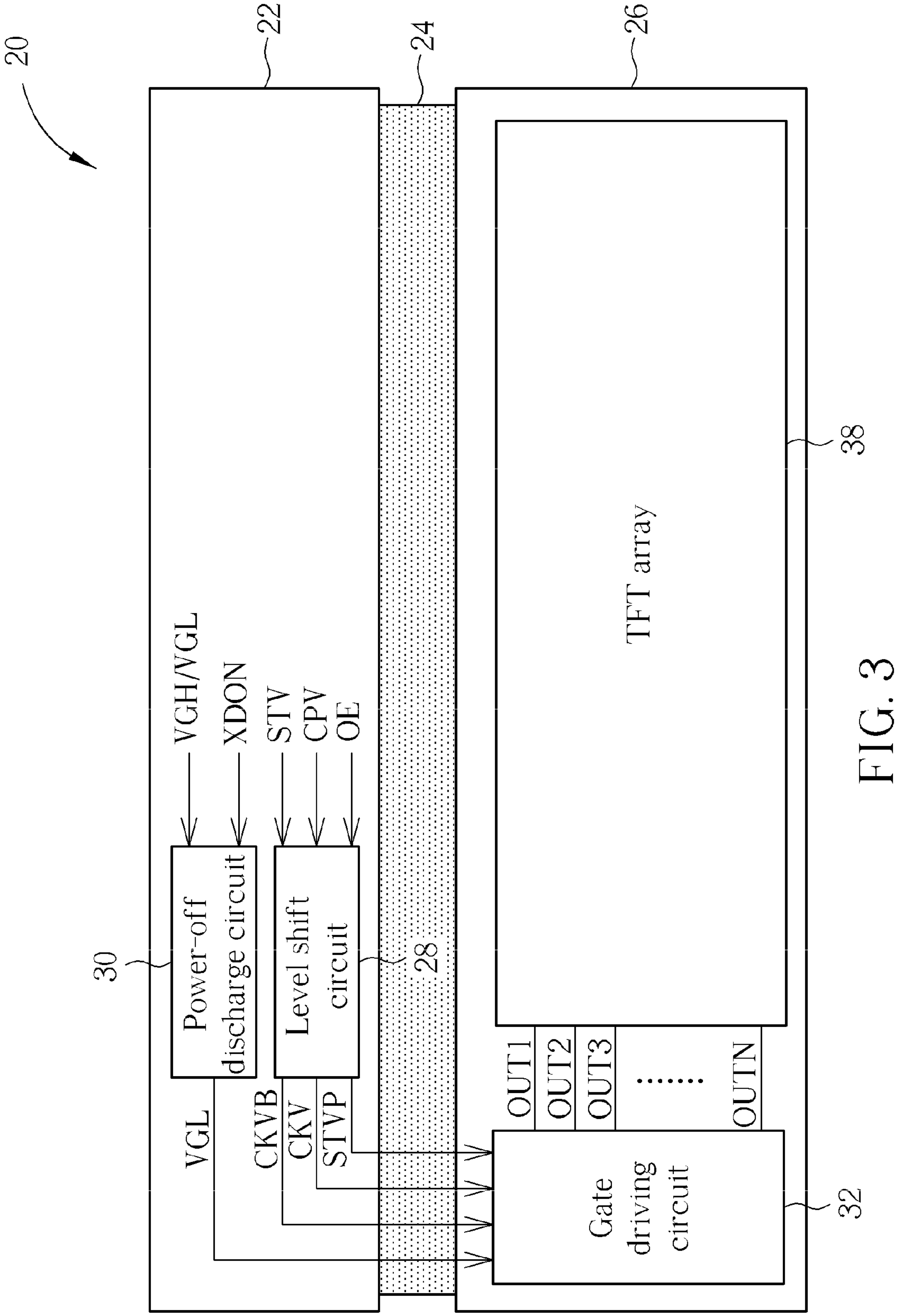
FIG. 3 is a block diagram illustrating a GIP LCD of the present invention.

Please refer to FIG. 3. FIG. 3 is a block diagram illustrating a GIP LCD of the present invention. The LCD 20 comprises a Printed Wire Board (PWB) 22, a Flexible Printed Circuit (FPC) 24, and a display panel 26. The PWB 22 comprises a level shift circuit 28 and a power-off discharge circuit 30. The display panel 26 comprises a gate driving circuit 32 and a TFT array 34. The gate driving circuit 32 formed on the glass substrate is composed of shift registers which are fabricated in the TFT process. The level shift circuit 28 generates a start signal STVP having the high level, a first clock signal CKV, and a second clock signal CKVB, according to a start signal STV, a clock signal CPV, and an enabling signal OE, wherein the first clock signal CKV and the second clock signal CKVB are complementary signals. The power-off discharge circuit 30 outputs the gate voltage according to an off signal XDON, a gate high voltage VGH, and a gate low voltage VGL. The start signal STVP having the high level, the first clock signal CKV, the second clock signal CKVB, and the gate low voltage VGL, are transmitted to the gate driving circuit 32 through the FPC 24, for generating the gate control signals to drive the TFTs on the TFT array 38.

Figure 4:
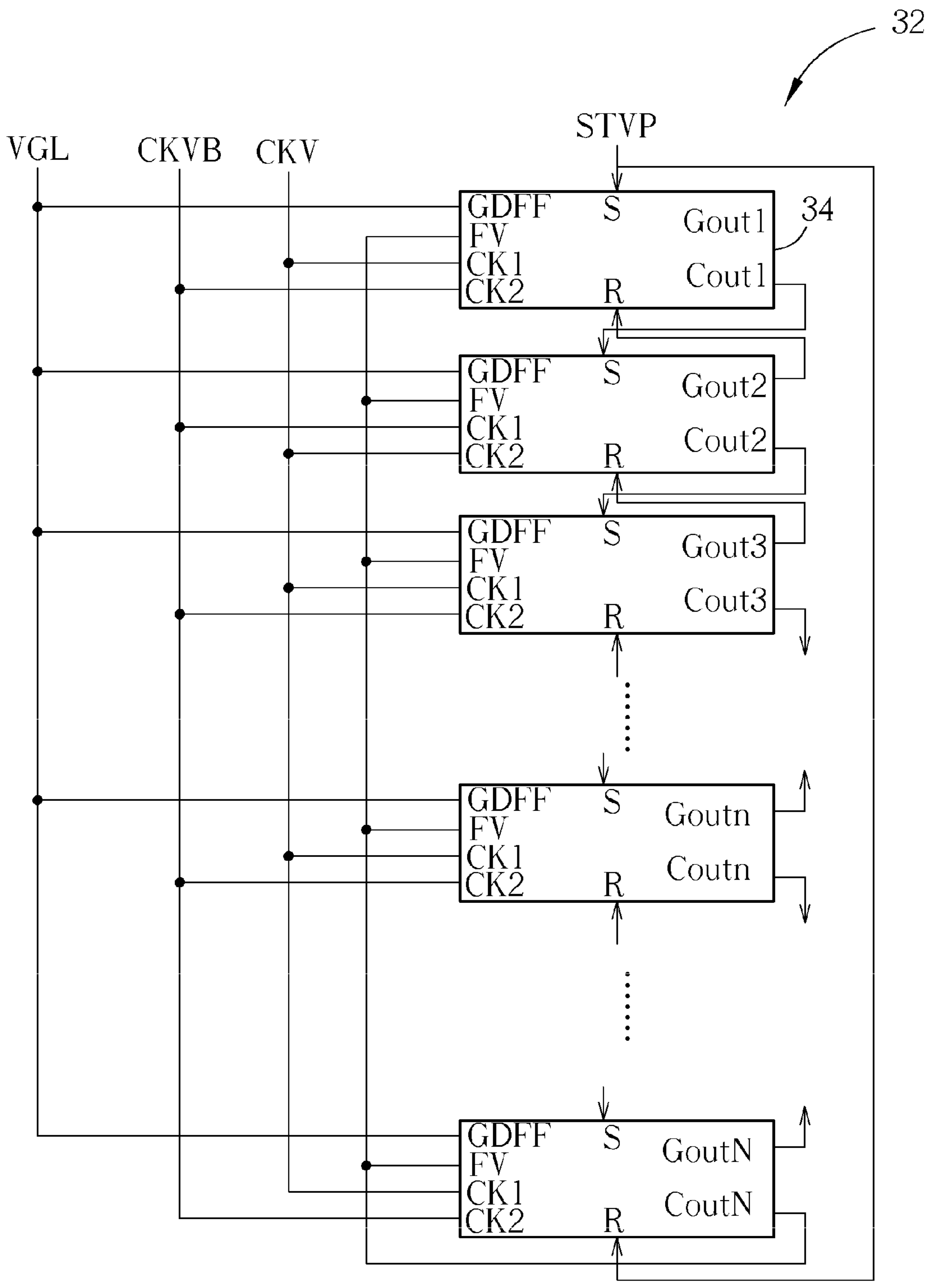
FIG. 4 is a circuit diagram illustrating the gate driving circuit of the present invention.
Figure 5:
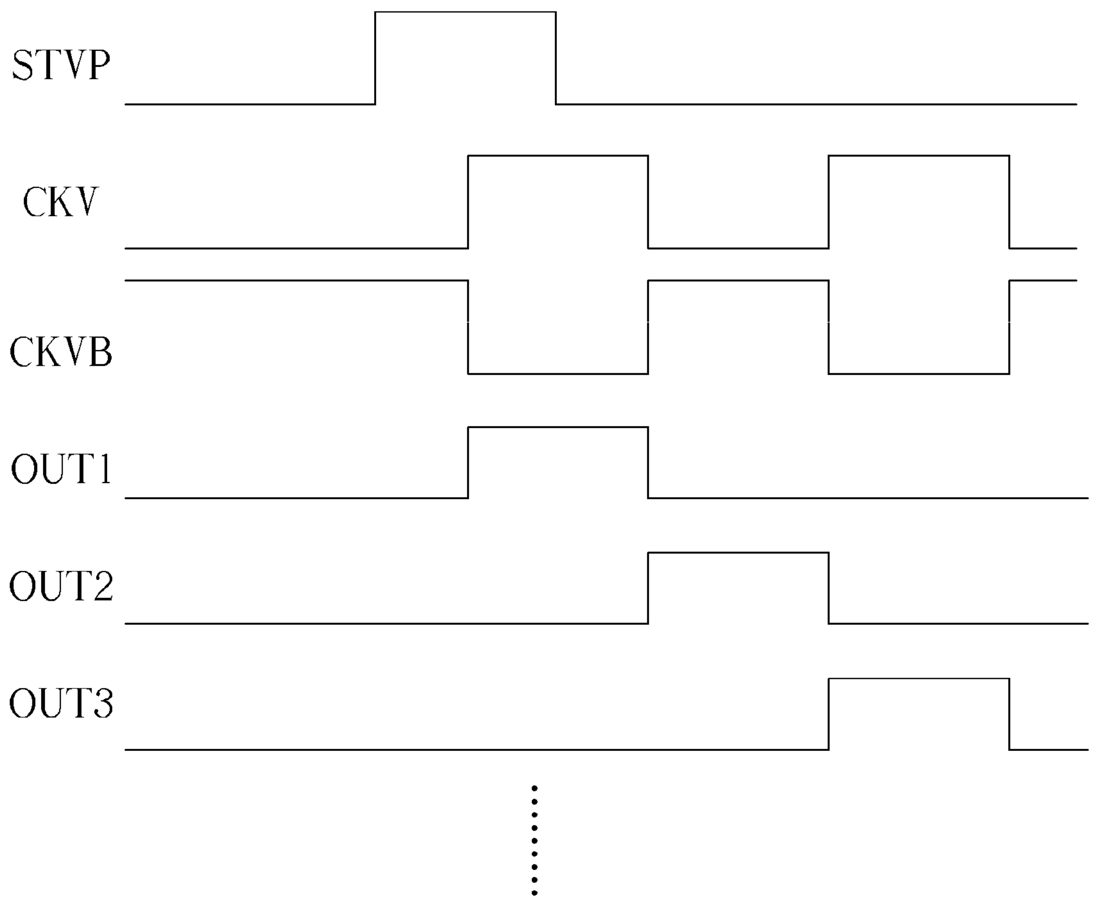
FIG. 5 is a waveform diagram illustrating the signals of the gate driving circuit of the present invention.

Please refer to FIG. 4 and FIG. 5. FIG. 4 is a circuit diagram illustrating the gate driving circuit 32. FIG. 5 is a waveform diagram illustrating the signals of the gate driving circuit 32. The gate driving circuit 32 is a shift register comprising SR latches 34, wherein the number of the SR latches 34 is N. The gate driving circuit 32 is driven by the first clock signal CKV and the second clock signal CKVB. The input ends CK1 and CK2 of the odd SR latches 34 receive the first clock signal CKV and the second clock signal CKVB, respectively; the input ends CK1 and CK2 of the even SR latches 34 receive the second clock signal CKVB and the first clock signal CKV, respectively. The gate control signal generated from each of the SR latches 34 is outputted to the TFT array 38. Furthermore, the set end S of each SR latch 34 receives the gate control signal generated from the previous SR latch 34; the reset end R of each SR latch 34 receives the gate control signal generated from the next SR latch 34. The set end S of the first SR latch 34 and the reset end of the last SR latch 34 receive the start signal STVP having the high level. The gate low voltage VGL utilizes DC level for providing each SR latch 34 so as to generate the voltage level of the gate control signal. The start signal STVP having the high level, the first clock signal CKV, and the second clock signal CKVB, and the gate low voltage VGL, are generated by the level shift circuit 28 and the power-off discharge circuit 30, disposed on the PWB 22. The gate control signal of each odd SR latch 34 follows the first clock signal CKV, and the gate control signal of each even SR latch 34 follows the second clock signal CKVB.

Figure 6:
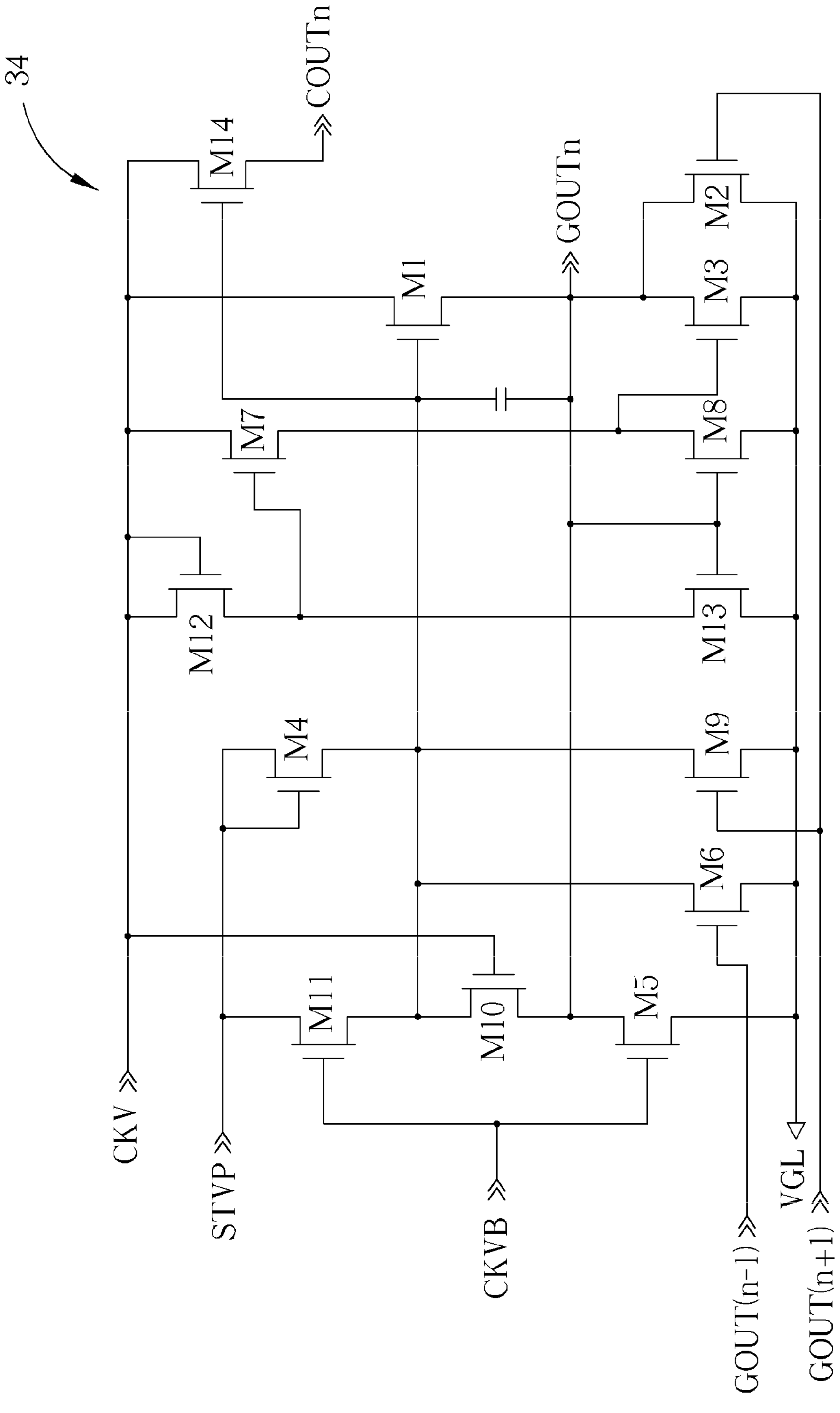
FIG. 6 is a circuit diagram illustrating the nth SR latch of FIG. 4.

Please refer to FIG. 6. FIG. 6 is a circuit diagram illustrating the $n^{th}$ SR latch 34 of FIG. 4. When the gate driving circuit 32 turns on the gate lines of the TFT array 38, the transistor M1 transmits the gate high voltage VGH to the corresponding gate line according to the first clock signal CKV; when the gate driving circuit turns off the gate lines of the TFT array 38, the transistors M5 and M3 are turned on in turn so as to make the corresponding gate line output the gate low voltage VGL. When the first clock signal CKV is high, and the second clock signal CKVB is low, the odd SR latch 34 outputs the gate low voltage VGL through the transistor M3, and the even SR latch 34 outputs the gate low voltage VGL through the transistor M5. When the first clock signal CKV is low, and the second clock signal CKVB is high, the odd SR latch 34 outputs the gate low voltage VGL through the transistor M5, and the even SR latch 34 outputs the gate low voltage VGL through the transistor M3. Assuming the gate driving circuit 32 comprises N gate lines, when the gate driving circuit 32 operates, only one gate line receives the gate high voltage VGH while the rest of the gate lines receive the gate low voltage VGL. During the blanking period, all gate lines receive the gate low voltage VGL. Thus, at the moment when the LCD 20 is turned off, it is possible that one gate line receives the gate high voltage VGH while the rest of the gate lines receive the gate low voltage VGL, or all gate lines receive the gate low voltage VGL. Consequently, the present invention utilizes the off signal XDON, generated at the moment when the LCD 20 is turned off, to trigger the power-off discharge circuit 30 for changing the gate low voltage VGL to be the gate high voltage VGH. In this way, at the moment when the LCD 20 is turned off, all TFTs of the TFT array 38 are turned on for discharging the residual electric charge so as to eliminate the power-off residual images.

Figure 7:
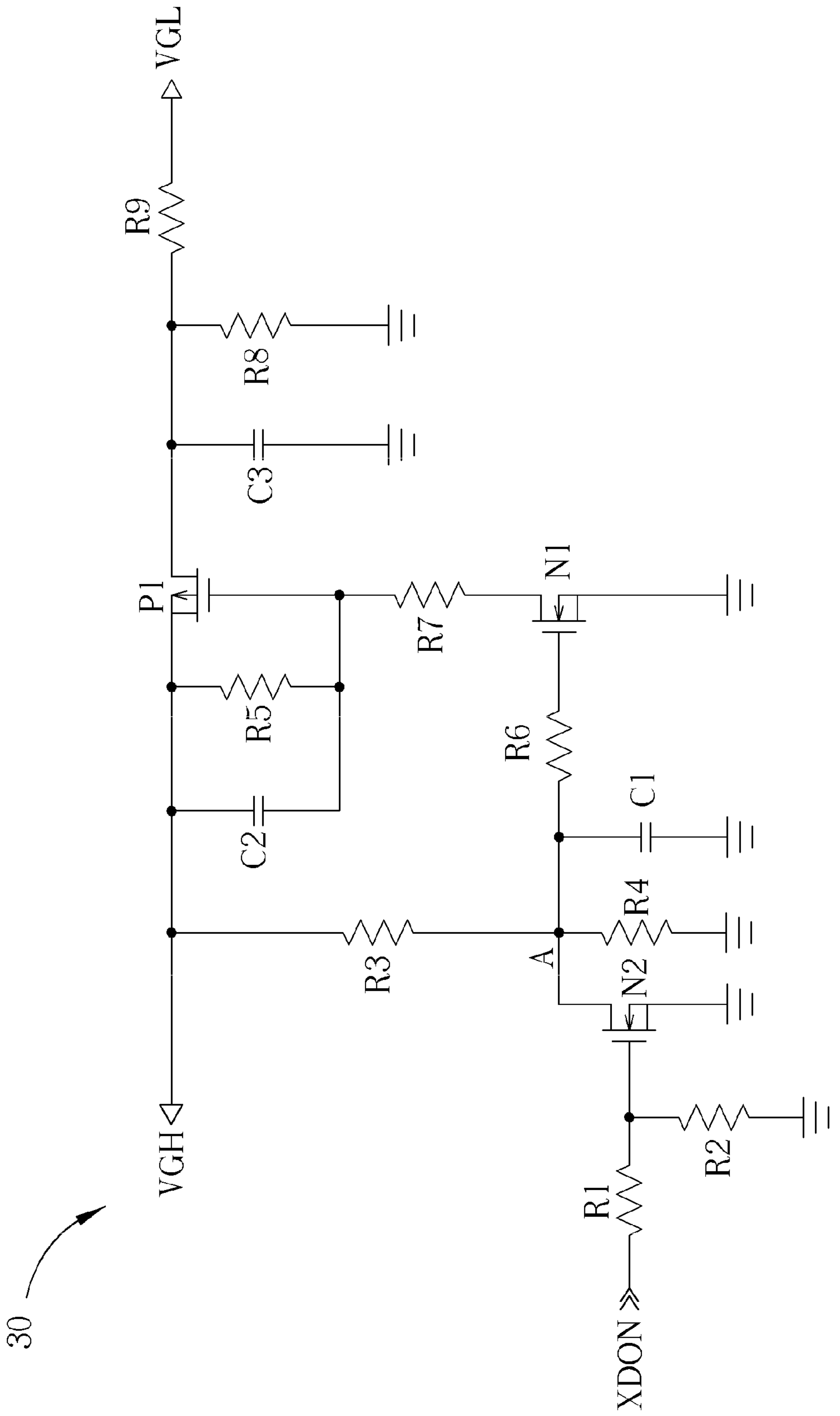
FIG. 7 is a circuit diagram illustrating the power-off discharge circuit of the present invention.

Please refer to FIG. 7. FIG. 7 is a circuit diagram illustrating the power-off discharge circuit 30 of the present invention. The power-off discharge circuit 30 comprises a PMOS transistor P1, an NMOS transistor N1, an NMOS transistor N2, nine resistors R1~R9, and three capacitors C1~C3. The first resistor R1 is electrically connected between the gate of the transistor N2 and the off-signal end XDON; the second resistor R2 is electrically connected between the gate of the transistor N2 and the ground end; the third resistor R3 is electrically connected between the drain of the transistor N2 and the gate-high-voltage end VGH; the fourth resistor R4 is electrically connected between the drain of the transistor N2 and the ground end; the fifth resistor R5 is electrically connected between the source of the transistor P1 and the gate of the transistor P1; the sixth resistor R6 is electrically connected between the drain of the transistor N2 and the gate of the transistor N1; the seventh resistor R7 is electrically connected between the gate of the transistor P1 and the drain of the transistor N1; the eighth resistor R8 is electrically connected between the drain of the transistor P1 and the ground end; the ninth resistor R9 is electrically connected between the drain of the transistor P1 and the gate-low-voltage end VGL. The first capacitor C1 is electrically connected between the drain of the transistor N2 and the ground end; the second capacitor C2 is electrically connected between the source of the transistor P1 and the gate of the transistor P1; the third capacitor C3 is electrically connected between the drain of the transistor P1 and the ground end. When the off signal XDON is high, the transistor N2 is turned on, and the voltage on the node A is the ground voltage, which turns off the transistor N1, so that the gate voltage of the transistor P1 is the gate high voltage VGH, which turns off the transistor P1. In this way, the gate high voltage VGH and the gate low voltage VGL are isolated. When the off signal is low, the transistor N2 is turned off, and the voltage on the node A is VGH*R4/(R3+R4), which turns on the transistor N1, so that the gate voltage of the transistor P1 becomes lower than the gate high voltage VGH, which turns on the transistor P1. In this way, the gate-high-voltage end VGH is electrically connected to the gate-low-voltage end VGL. At the moment when the LCD 20 is turned off, the off signal XDON changes from the high level to the low level, and the gate low voltage VGL is pulled up to the gate high voltage VGH, which turns on all the TFTs of the TFT array 38.

Figure 8:
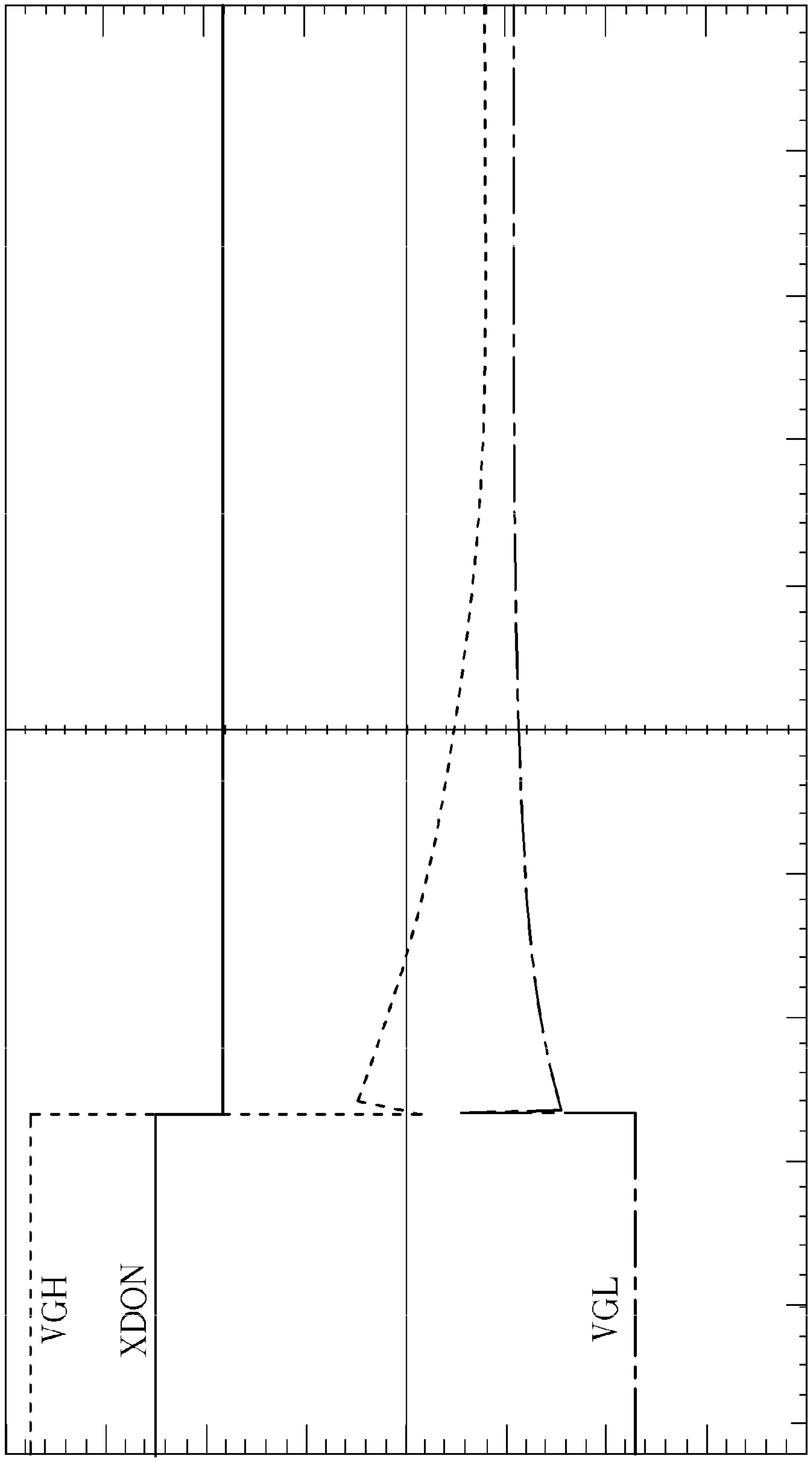
FIG. 8 is a waveform diagram illustrating the signals of the LCD of the present invention when the LCD of the present invention is turned off.

Please refer to FIG. 8. FIG. 8 is a waveform diagram illustrating the signals of the LCD 20 during the off state of the LCD 20. Since the off signal XDON changes from the high level to the low level at the moment of the LCD 20 being turned off, which triggers the power-off discharge circuit 30, and the gate-high-voltage end VGH is electrically connected to the gate-low-voltage end VGL, and subsequently the gate low voltage VGL is affected by the gate high voltage VGH and the related impendence, the gate low voltage VGL falls at a voltage level lower than the gate high voltage VGH, but is still capable of turning on the TFTs of the TFT array 38. In this way, the power-off residual images can be effectively eliminated.

To sum up, the gate driver disposed on the display panel of the LCD is capable of eliminating the power-off residual images. The LCD of the present invention comprises a PWB, a FPC, and a display panel. The PWB comprises a level shift circuit and a power-off discharge circuit. The display panel comprises a gate driving circuit and a TFT array. The power-off discharge circuit is capable of electrically connecting a gate-low-voltage end to a gate-high-voltage end at the moment of the LCD being turned off for driving the gate driving circuit to turn on all TFTs of the TFT array.

Those skilled in the art will readily observe that numerous modifications and alterations of the device and method may be made while retaining the teachings of the invention.

What is claimed is:

1. A power-off discharge circuit of a Liquid Crystal Display (LCD), the LCD having a gate driver disposed on a display panel of the LCD, the power-off discharge circuit comprising:

- a first transistor, comprising a gate, a source electrically connected to a high-voltage end, and a drain;
- a second transistor, comprising a gate, a source electrically connected to a ground end, and a drain;
- a third transistor, comprising a gate, a source electrically connected to the ground end, and a drain;
- a first resistor, electrically connected between the gate of the third transistor and a power control end;
- a second resistor, electrically connected between the gate of the third transistor and the ground end;
- a third resistor, electrically connected between the drain of the third transistor and the high-voltage end;
- a fourth resistor, electrically connected between the drain of the third transistor and the ground end;
- a fifth resistor, electrically connected between the source of the first transistor and the gate of the first transistor;
- a sixth resistor, electrically connected between the drain of the third transistor and the gate of the second transistor;
- a seventh resistor, electrically connected between the gate of the first transistor and the drain of the second transistor;
- an eighth resistor, electrically connected between the drain of the first transistor and the ground end;
- a ninth resistor, electrically connected between the drain of the first transistor and a low-voltage end;
- a first capacitor, electrically connected between the drain of the third transistor and the ground end;
- a second capacitor, electrically connected between the source of the first transistor and the gate of the first transistor; and
- a third capacitor, electrically connected between the drain of the first transistor and the ground end.

2. The power-off discharge circuit of claim 1, wherein the first transistor is a PMOS transistor, and the second and the third transistors are NMOS transistors.

3. The power-off discharge circuit of claim 1, wherein when the power control end carries a high-level signal, the first and the second transistors are turned off, and the third transistor is turned on.

4. The power-off discharge circuit of claim 1, wherein when the power control end carries a low-level signal, the first and the second transistors are turned on, and the third transistor is turned off.

5. An LCD, comprising:

- a display panel, comprising:
  - a Thin Film Transistor (TFT) array; and
  - a gate driving circuit for driving the TFT array;
- a Printed Wire Board (PWB), comprising:
  - a level shift circuit for generating signals controlling the gate driving circuit; and
  - a power-off discharge circuit for electrically connecting a high-voltage end to a low-voltage end during off state of the LCD, wherein the power-off discharge circuit comprises:
    - a first transistor, comprising a gate, a source electrically connected to the high-voltage end, and a drain;
    - a second transistor, comprising a gate, a source electrically connected to a ground end, and a drain;
    - a third transistor, comprising a gate, a source electrically connected to the ground end, and a drain;
    - a first resistor, electrically connected between the gate of the third transistor and a power control end;
    - a second resistor, electrically connected between the gate of the third transistor and the ground end;
    - a third resistor, electrically connected between the drain of the third transistor and the high-voltage end;
    - a fourth resistor, electrically connected between the drain of the third transistor and the ground end;
    - a fifth resistor, electrically connected between the source of the first transistor and the gate of the first transistor;
    - a sixth resistor, electrically connected between the drain of the third transistor and the gate of the second transistor;
    - a seventh resistor, electrically connected between the gate of the first transistor and the drain of the second transistor;
    - an eighth resistor, electrically connected between the drain of the first transistor and the ground end;
    - a ninth resistor, electrically connected between the drain of the first transistor and the low-voltage end;
    - a first capacitor, electrically connected between the drain of the third transistor and the ground end;
    - a second capacitor, electrically connected between the source of the first transistor and the gate of the first transistor; and
    - a third capacitor, electrically connected between the drain of the first transistor and the ground end; and
- a Flexible Printed Circuit (FPC), electrically connected between the display panel and the PWB, for transmitting the signals controlling the gate driving circuit.

6. The LCD of claim 5, wherein the gate driving circuit is formed with TFTs.

7. The LCD of claim 5, wherein the gate driving circuit is electrically connected to the low-voltage end.

8. The LCD of claim 5, wherein the first transistor is a PMOS transistor, and the second and the third transistors are NMOS transistors.

9. The LCD of claim 5, wherein when the power control end carries a high-level signal, the first and the second transistors are turned off, and the third transistor is turned on.

10. The LCD of claim 5, wherein when the power control end carries a low-level signal, the first and the second transistors are turned on, and the third transistor is turned off.

* * * * *